United States Patent
Zinser et al.

(10) Patent No.: US 8,688,124 B2
(45) Date of Patent: *Apr. 1, 2014

(54) HANDOFF METRIC FOR MULTIPLE TRANSMISSION TECHNOLOGIES

(71) Applicant: General Electric Company, Schenectady, NY (US)

(72) Inventors: Richard Louis Zinser, Niskayuna, NY (US); Michael James Hartman, Clifton Park, NY (US); John Erik Hershey, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/669,253

(22) Filed: Nov. 5, 2012

(65) Prior Publication Data

US 2013/0065592 A1  Mar. 14, 2013

Related U.S. Application Data

(63) Continuation of application No. 12/721,359, filed on Mar. 10, 2010, now Pat. No. 8,315,630.

(51) Int. Cl.
*H04W 36/00* (2009.01)
*H04W 72/00* (2009.01)
*H04W 4/00* (2009.01)
*H04B 7/00* (2006.01)

(52) U.S. Cl.
USPC ........ 455/436; 455/445; 455/435.2; 455/525; 370/331

(58) Field of Classification Search
USPC ............... 455/436, 445, 435.2, 525; 370/331, 370/244, 252
See application file for complete search history.

(56) References Cited

U.S. PATENT DOCUMENTS

| | | | |
|---|---|---|---|
| 2004/0002335 A1* | 1/2004 | Pan et al. | 455/439 |
| 2005/0008028 A1* | 1/2005 | Efrati et al. | 370/464 |
| 2007/0049276 A1* | 3/2007 | Rimoni et al. | 455/436 |
| 2007/0104166 A1* | 5/2007 | Rahman et al. | 370/338 |
| 2008/0031277 A1* | 2/2008 | Walter et al. | 370/469 |
| 2009/0323632 A1* | 12/2009 | Nix | 370/331 |
| 2010/0279653 A1* | 11/2010 | Poltorak | 455/410 |

OTHER PUBLICATIONS

Jan. 1, 2009 Objective Measurements of Speech Quality in VOIP over Wireless LAN during Handoff Nidhi Marwaha Gambhir San Jose State University.*

Gambhir, Nidhi Marwaha, Objective Measurement of Speech Quality in VoIP over Wireless LAN during Handoff, Master's Thesis and Graduate Research, San Jose State Univeristy—Jan. 1, 2009.

* cited by examiner

*Primary Examiner* — Vladimir Magloire
*Assistant Examiner* — Michael Mapa
(74) *Attorney, Agent, or Firm* — Jean K. Testa; Fletcher Yoder, P.C.

(57) ABSTRACT

Provided are methods and systems of managing a handoff in a multimedia communication network. Embodiments include estimating the voice quality of a communication route in the network. The voice quality may be estimated by using a total voice quality metric involving subtracting various impairments to the voice signal. Impairments may result from the type of vocoder in a communication route, the error or loss associated with RF links and network links, and delays in the communication route. After subtracting the impairments to obtain the total voice quality metric for the communication route, the total voice quality metric may be compared with a threshold and/or other total voice quality metrics of other communication routes to determine whether and when a handoff should be made.

25 Claims, 4 Drawing Sheets

| Vocoder | Vocoder | | RF Link | | | Subnetwork Link(s) | | | Impairment from Total Delay | Total Quality Score |
|---|---|---|---|---|---|---|---|---|---|---|
| | Base Quality Impairment | Impairment Factor (BER or PLR) | Delay | BER or PLR | Impairment from Loss | Delay | BER or PLR | Impairment from Net | Delay | | |
| 14a | | | | | | | | | | | |
| 14b | | | | | | | | | | | |
| 22a | | | | | | | | | | | |
| 22b | | | | | | | | | | | |
| 22c | | | | | | | | | | | |

FIG. 2

HANDOFF METRIC FOR MULTIPLE TRANSMISSION TECHNOLOGIES

CROSS-REFERENCE TO RELATED APPLICATION

This application is a continuation of application Ser. No. 12/721,359, filed Mar. 10, 2010, entitled "HANDOFF METRIC FOR MULTIPLE TRANSMISSION TECHNOLOGIES", in the name of Richard Louis Zinser and assigned to General Electric Company, which is incorporated herein by reference in its entirety.

BACKGROUND

The subject matter disclosed herein relates to communication systems, and more particularly, to systems and methods of conducting handoffs based on voice quality of a communication.

A communication system may include communication devices capable of transmitting and receiving human speech. For example, a user may speak into a first communication device, and the speech waveform may be compressed and digitized and then transmitted to a second communication device. The compressed digital signal may be decompressed to reconstruct an approximation of the original speech waveform. The compression and decompression of speech signals in a communication system may involve voice encoders, commonly referred to as "vocoders."

Communication devices may be connected within a network through different communication routes. Each communication route connecting a device within the network may include a link between the device and a vocoder. The vocoder may be linked to a network node, which may be connected through its own subnetwork within the communication network. A communication network may have multiple communication routes, as the network may include multiple subnetworks, network nodes, and vocoders. The particular communication route of a communication device may depend on the signal strength between the device and the node. As signal strength may change during a communication, the link between a device and a node may sometimes be switched to maintain an acceptable signal strength. For example, a connection between a communication device and a first network node may be switched to enable a communication between the device and a second network node for increased signal strength. Such a switch in communication between device and network node may be referred to as a "handoff."

As communication systems evolve, other parameters in addition to signal strength may be used in conducting handoffs in a communication network. While signal strength may be used as a metric for conducting a handoff between network nodes connected to a fixed circuit-switched landline, signal strength alone may be an inadequate metric for conducting handoffs in a multimedia communication network using a multi-hop packet-switched system. A multimedia network system may include different types of wireless services (e.g., cellular services and VoIP services) which transmit packets over different links (e.g., fixed links or radio frequency links) having different frequencies and different degradation characteristics. Furthermore, different communication technologies may use vocoders having different architectures or incompatible bit streams, which may also affect speech transmission. Thus, using a metric more suitable for a multimedia communication network may improve communication quality.

BRIEF DESCRIPTION

One embodiment includes a method of managing a communication in a communication network. The method includes estimating a total voice quality metric for a communication route in the communication network and controlling a handoff based on the total voice quality metric estimation.

Another embodiment includes a method of managing a handoff in a multimedia communication network. The method includes computing a vocoder impairment based on the vocoder selected for a communication route in the network, computing a radio frequency (RF) link impairment based on one or more RF links selected for the communication route, computing a subnetwork impairment based on the subnetwork selected for the communication route, and computing a delay impairment based on a total delay incurred in transferring data through the selected vocoder, the selected one or more RF links, and the selected subnetwork. The method includes computing a total voice quality metric of the communication route based on the vocoder impairment, the RF link impairment, the subnetwork impairment, and the delay impairment and determining whether and when to make a handoff based on the total voice quality metric of the communication route.

Yet another embodiment includes a communication system which includes memory configured to store vocoder information corresponding to one or more vocoders in the system, a processor configured to calculate the voice quality of a communication route based at least on the vocoder information and configured to conduct a handoff based at least on the voice quality of the communication route.

Yet another embodiment includes a method for managing a handoff in a communication network. The method includes estimating a voice quality for a communication route in the communication network. Estimating the voice quality includes determining one or more impairments to the voice quality of the communication route, subtracting the one or more impairments from the voice quality to produce the voice quality estimation, and controlling a handoff based on the voice quality estimation.

DRAWINGS

These and other features, aspects, and advantages of the present invention will become better understood when the following detailed description is read with reference to the accompanying drawings in which like characters represent like parts throughout the drawings, wherein:

FIG. 2 is a table including possible impairment contributions to speech transmission in a communication network, in accordance with embodiments of the present techniques;

DETAILED DESCRIPTION

A communication system may include the wireless transmitting and receiving of human speech from one communication device to another. For example, a communication (i.e., a transfer of human speech from one device to another) may be in part enabled by the connection of communication devices within a communication network. In a communication network, a device may communicate with other devices in the network by connecting to the network via links with one or more network nodes. The network node may be linked to controllers or gateways, which may be linked to a common communications medium (e.g., a wired telephone network), such that all devices in the network are connected.

A communication between two devices in a network may include a communication route of links connecting two devices. A "link" may refer to a connection, a transferred signal, etc., between a communication device, a vocoder, network node, and/or a controller in the network. A communication route may refer to a series of links which connect a device to a communication medium in the network. A processor in the communication network may conduct the linking of devices in the network, and may link the communication device to a selected vocoder or a selected network node based on which links may have the highest signal quality. For example, in an embodiment, signal quality may include metrics such as signal strength and voice quality. During the duration of the communication, the signal quality between a communication device and a network node may change. To maintain a communication having acceptable signal qualities, the processor may link the communication device to a different network node. It may be desirable for such a transfer, referred to as a switch in communication or a "handoff," to occur with relatively little delay, such that the handoff may be substantially unnoticeable to a user of the communication device during the communication.

Figure 1:
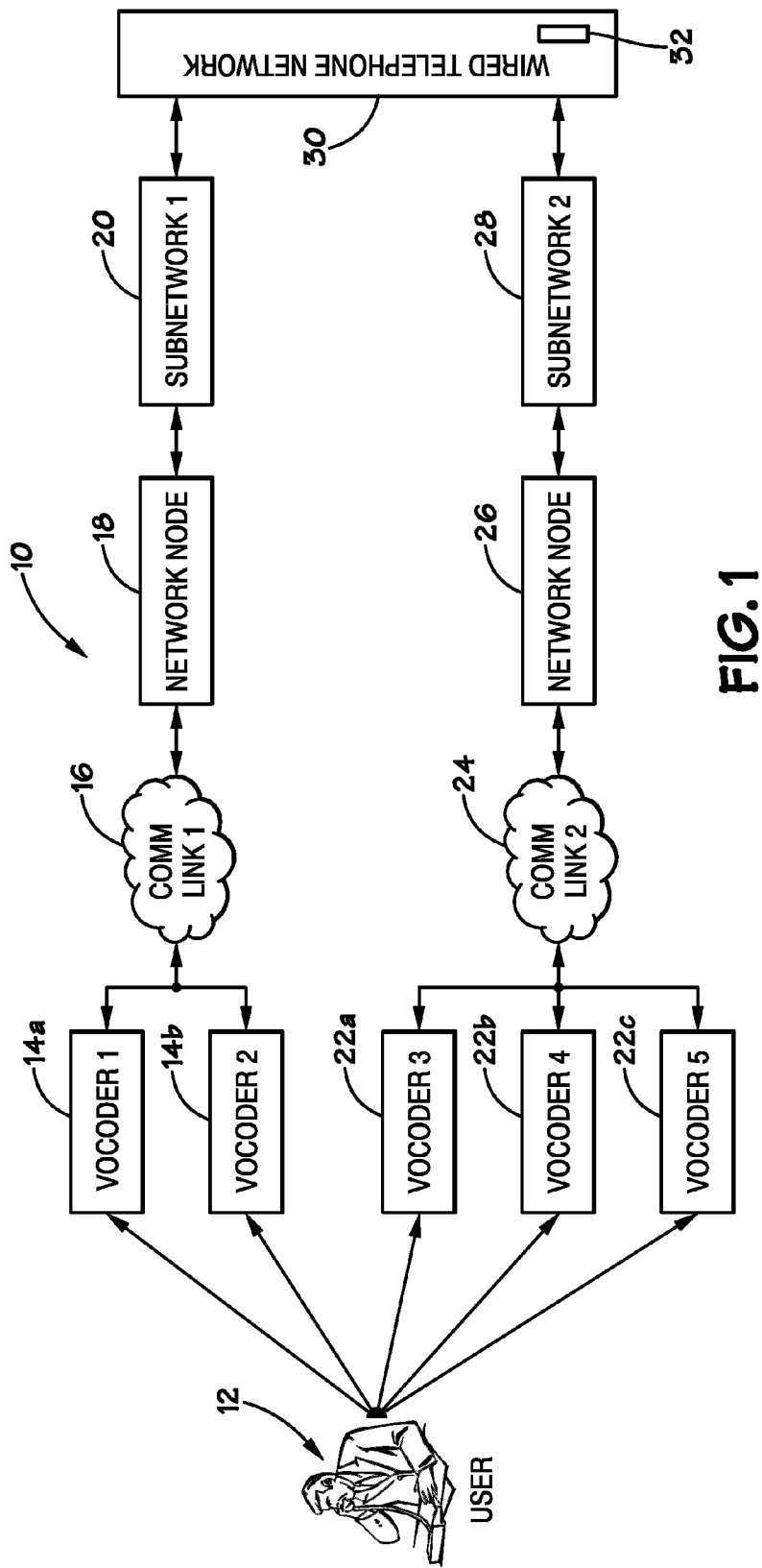
FIG. 1 is a diagram depicting possible routes in a portion of a multimedia communication network, in accordance with embodiments of the present techniques.

For example, a diagram depicting possible communication routes in a portion of a multimedia communication network 10 is illustrated in FIG. 1. A communication device user 12 may be connected to a communication medium such as the wired telephone network 30 via many different non-overlapping routes of links. Each route may include a choice of one or more vocoders 14a, 14b, 22a, 22b, and 22c which are connected through wireless communication links 16 and 24 to a network node 18 and 26. The network nodes 18 and 26 may then be connected to the wired telephone network 30 through their own subnetworks 20 and 28. The subnetworks 20 and 28 may each include other network nodes or controllers of network nodes. While the illustrated portion of a multimedia communication network 10 is used as an example of one type of communication network for which the present techniques may be implemented, methods of managing handoffs in a multimedia network may also be implemented between different types of wireless networks and may include various other devices (e.g., different types of communication devices, network nodes, and controllers) which may not all be illustrated in the network 10.

The multimedia network 10 may also include a processor 32 which may substantially control links between one or more devices in the network 10. For example, the processor 32 may be coupled to the wired telephone network 30, and in some embodiments, the processor 32 may be coupled directly to network nodes or communication devices. The processor 32 may determine various parameters corresponding to the links in a network 10, and may also conduct handoffs based on an analysis of the link parameters. In some embodiments, the processor 32 may calculate parameters such as estimated voice signal impairments or total voice quality metrics for various communication routes.

A typical method of conducting a handoff within a network may include using a signal strength handoff metric. Using a signal strength handoff metric may be efficient for networks having cellular base stations connected to fixed circuit-switched landlines. However, communication systems have evolved, and a typical multimedia network system may include different types of wireless services in addition to cellular services, such as, for example VoIP services. For example, the network node 18 may represent a cellular base station used to connect communication devices in a cellular service, and the network node 26 may represent a VoIP access point used to connect communication devices in a VoIP service. Each of the different types of wireless services in a multimedia network 10 may use different types of links, such as link 16 which connects a vocoder 14a or 14b to the base station 18, or link 24 which connects a vocoder 22a, 22b, or 22c to the access point 26. These different types of links 16 and 24 may transfer data over different routes, medium, and/or frequencies. For example, a cellular network may use radio frequency (RF) links, while a VoIP network may use a multi-hop packet-switched connection, and may have only one RF-based link (e.g., the wireless link between a network node 26 and a selected vocoder 22a, 22b, or 22c). Due to the different types of communication links 16 and 24 used in a multimedia communication network 10, the transferred data within the network 10 may also experience different degradation characteristics. Furthermore, different wireless services may also use vocoders in the encoding and decoding of voice signals. For example, vocoders 14a and 14b may have different architectures or incompatible bit streams with vocoders 22a, 22b, and 22c. Such differences in vocoder types used for different wireless networks may also affect speech transmission and complicate typical handoff techniques.

As data transfers differ across the different types of wireless services in a communication network, signal strength may be an insufficient determinant of the quality of a communication. For example, bit error rate (BER) may be a typical metric used to measure signal degradation. However, while a single bit error may result in a packet drop in a VoIP link (e.g., link 24), such a bit error may be unnoticeable by a user communicating through a cellular link (e.g., link 16). Thus, if a multimedia network conducts handoffs solely based on signal strength (e.g., handing off at some threshold level of signal degradation or BER), handoffs may be conducted during a communication even if the communicating users would have experienced no perceptible loss in voice quality. Conducting such unnecessary handoffs in a multimedia network may lead to complexity and/or inefficiencies in the network. For example, ping-ponging could result when signal quality oscillations lead to rapid handoffs, which may lead to delays in a communication.

In some embodiments, a multimedia network 10 (or a processor 32 in the network) may conduct handoffs based on a quality metric which may be suitable for evaluating communication quality over different types of wireless links. For example, in some embodiments, a "total voice quality metric" may be used to conduct handoffs in a multimedia communication network. The total voice quality metric may include certain aspects of signal strength, but may not be merely a measure of signal strength. Determining the total voice quality metric may include other considerations which affect the voice quality of a voice signal that is spoken by one user and heard by another user during a communication. Additional considerations may include different impairments (e.g., degradations which affect the quality of the final transmitted voice signal) over various communication routes in a multimedia network 10 which may affect the quality of the voice signal during a communication. Such impairments may be determined and/or quantified using various metrics to determine the total voice quality metric. For example, a voice quality metric may include the International Telecommunication Union (ITU) E-model defined in Recommendation G.107, which provides a prediction of the expected voice quality as perceived by a communication device user. The E-model may account for any predictable sources of voice quality impairments along a communication route (from a speaker of one communication device to a listener of a second communication device) under typical communication conditions.

The voice quality prediction of the E-model may be an additive linear voice quality rating referred to as the R-factor or the R-score, and may be on a scale from 0 to 100. For example, in one embodiment, a score of 100 may be considered high voice quality, a score of 75 may be considered medium voice quality, and a score of 50 may be considered low voice quality and may result in a handoff. In other embodiments, any classifications or thresholds based on the R-factor may vary, and any handoffs conducted based on the classifications or thresholds of the R-factor may also vary.

A table 50 including possible impairment contributions used to determine a total voice quality metric for a speech transmission in a communication network is provided in FIG. 2. To further illustrate the quality metric concept, the table 50 may be adapted to the multimedia communication network 10 of FIG. 1, and may provide a total quality score 60 for each of the five possible communication routes in FIG. 1, where a different vocoder (14a, 14b, 22a, 22b, or 22c) is selected in each route. The total voice quality metric may be represented by the total quality score 60, which may refer to a quality of a voice or speech signal as perceived by a communication device user.

In one embodiment, the impairment contributions in each communication route may include vocoder impairments 52, RF link impairments 54, and subnetwork impairments 56. Such impairments may be determined, for example, using methodology similar to that found in ITU-T Recommendation P.833. Vocoder impairments 52 may include baseline quality impairments, impairments due to bit errors or packet losses (BER or PLR), and algorithmic delays of the vocoders. The baseline quality impairments may represent the quality of the vocoder itself with no bit errors or packet losses, and may be subtracted from the R-score. The impairment factor due to bit error or packet loss may result from low signal levels on an RF link or packet loss on a congested subnetwork link. The bit error impairment factor may be multiplied by the BER in a bit-oriented link to produce a number that is subtracted from the R-score. The BER impairment may also be used for a conventional circuit connection similar to a cellular RF link. The packet loss impairment factor may be multiplied by the PLR in a packet-switched network to produce a number that is subtracted from the R-score. Unlike the BER impairment, the PLR impairment may not be relevant for a circuit-switched link. The algorithmic delays may be the total delay from the vocoder based on the frame sizes used in compressing and decompressing voice signals. As will later be discussed, the delays from the vocoder may be combined with other delays along a communication route to determine an impairment from total delays. The vocoder impairments 52 may be known in advance, since the vocoders used in a communication network 10 may have known characteristics.

A communication route may include any number of links which transfer the data to enable communication between two devices, and impairments to voice quality may result from any of these links. For example, a communication route involving vocoders 14a or 14b may also include link 16 which contributes to RF link impairments 54 and any links in the subnetwork 20 which contribute to subnetwork link(s) impairments 56. Similarly, a communication route involving vocoders 22a, 22b, or 22c may also include link 24 (contributing to RF link impairments 54) and any links in the subnetwork 28 (contributing to subnetwork link(s) impairments). Each link in a communication network 10 (FIG. 1) may be classified as either packet-switched, meaning the link may be degraded by packet losses, or bit-oriented, meaning the link may be degraded by bit errors. For packet-switched links, the PLR may be measured and multiplied by the vocoder loss impairment factor of the corresponding vocoder used in that particular communication route (e.g., vocoder 14a or 14b for link 16). For bit-oriented links, the BER may be measured and multiplied by the appropriate vocoder error rate impairment factors. The resulting numbers may be subtracted from the R-score.

The total delay may be calculated by summing all delays in a communication route, including the vocoder algorithmic delay and all individual link delays. The impairment from total delay 58 may then be calculated using equations 3-27 and 3-28 from Recommendation G.107 of the ITU E-model. The equations (renumbered) are reproduced below:

$$Idd = 25\left\{(1+X^6)^{\frac{1}{6}} - 3\left(1 + \left[\frac{X}{3}\right]^6\right)^{\frac{1}{6}} + 2\right\} \quad \text{(equation 1)}$$

and $$X = \frac{\log\left(\frac{Ta}{100}\right)}{\log 2}, \quad \text{(equation 2)}$$

where Ta may represent the summed total delay and Idd may represent impairment from total delay.

The impairment from total delay 58 for each communication route may also be subtracted from the R-score. Therefore, subtracting all impairments in each communication route, results in the total quality score 60 for each communication route. The calculation for the total quality score 60 may be represented in the equation below:

$$Rs = R_0 - Iv - Irf - Isn - Idd \quad \text{(equation 3)},$$

where Rs represents the total quality score 60 for each communication route in a network. $R_0$ represents a perfect R-score with no impairments, Iv represents the impairment from the vocoder used in each communication route (including basic vocoder quality but excluding BER or PLR impairments of the vocoder), Irf represents the impairment from the RF links arising from BER/PLR losses (which are computed by multiplying the RF error or loss rate by the vocoder error or loss impairment factors, respectively), Isn represents the impairment from other links in the subnetwork arising from BER/PLR losses on the subnetwork (which are computed by multiplying the subnetwork error or loss rate by the vocoder error or loss impairment factors, respectively), and Idd represents the impairment from total delay (including the delays arising from the vocoder itself and delays summed from each portion of a communication route, and calculated using equations 1 and 2 above).

Figure 3:
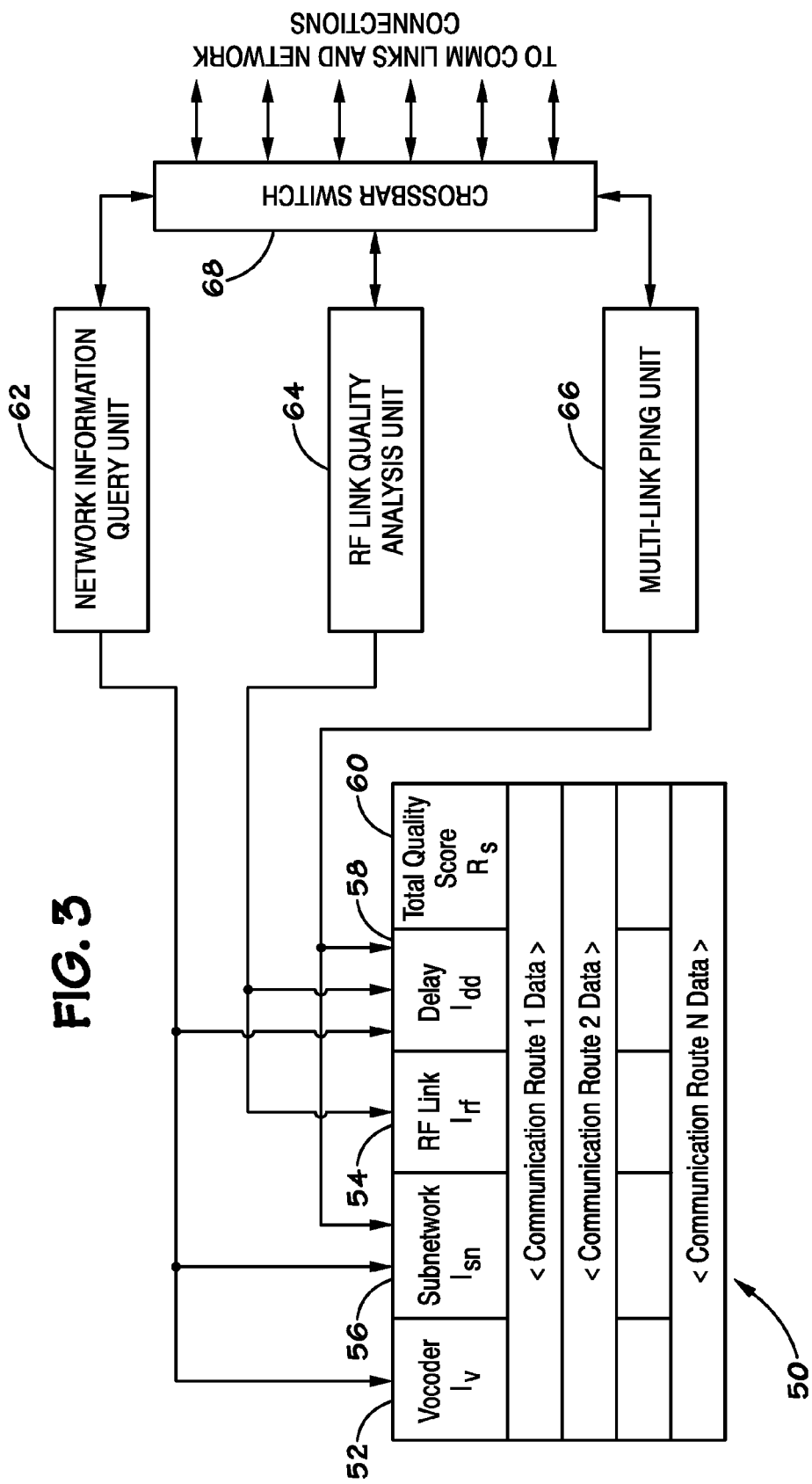
FIG. 3 is a diagram depicting how data corresponding to possible impairment contributions to speech transmission may be stored and/or computed in a communication network, in accordance with embodiments of the present techniques.

A summary of the table 50 explained in FIG. 2 is provided in FIG. 3, which illustrates a diagram of where and/or how the communication route data of the table 50 may be stored and/or computed in a communication network 10 (as in FIG. 1). Certain data relevant to determining the total quality score 60 may be known in advance and may be stored in a network information query unit 62. The network information query unit 62 may include memory suitable to storing network information, and may be accessible by a processor (e.g., processor 32 in FIG. 1) which may use communication rate data to manage handoffs in a network. In one embodiment, the vocoders used for different communication routes in a network may be pre-determined, and impairments associated with vocoders (Iv 52 and the BER/PLR loss impairment factors) may be known in advance and stored in the network information query unit 62. Some impairments associated with subnetworks (Isn 56) may also be stored in the network information query unit 62. Furthermore, delays from vocoders (e.g., algorithmic delays inherent to vocoders) and sub-network delays may contribute to the total delay (Idd 58), and such delay information may also be stored in the network information query unit 62.

As each subnetwork (e.g., subnetworks 20 and 28 in FIG. 1) may include multiple possible links (e.g., between network nodes or controllers), a multi-link ping unit 66 may be used to compute the delays associated with data transfers for communication routes within the subnetwork (e.g., sub-routes). The multi-link ping unit 66 may also calculate data losses incurred in each sub-route of a subnetwork. The computed losses and delays associated with different sub-routes in a subnetwork may also be used to determine a total quality score 60 to be used in managing handoffs in a multimedia network 10.

Each communication route may also include an RF link. Depending on the type of wireless services used in a multimedia network 10, a communication route may predominantly use RF links (e.g., cellular systems), or may involve a multi-hop connection and use a RF link as a last step in a communication route (e.g., VoIP systems). Thus, the impairments contributed by RF links for different communication routes may vary significantly in a multimedia network 10. Furthermore, as communication device users (e.g., user 12) may constantly move relative to a network node with which the device is linked, the RF links may change throughout a communication, thus changing the impairments contributed by the RF links in the communication route of the user 12. RF link impairments (Irf 54), as well as delays associated with RF links, may be computed by the RF link quality analysis unit 64, and in some embodiments, the RF link quality analysis unit 64 may compute RF link impairments 54 dynamically. The RF link quality analysis unit 64 may be part of a processor 32 in the network 10, or may be a separate processing unit capable of analyzing RF link impairments 54 and using the impairment data to manage handoffs in a multimedia network 10.

Information stored in the network information query unit 62 and the information computed by the RF link quality analysis unit 64 and the multi-link ping unit 66 may all be used to manage handoffs in a multimedia network 10. For example, a processor 32 may use the information stored in and/or computed by the different units 62, 64, and 66 to manage a crossbar switch 68 which enables a handoff by switching links in communication routes. The crossbar switch 68 may be any switch capable of switching links (and thus changing communication routes) in a multimedia communication network 10.

Figure 4:
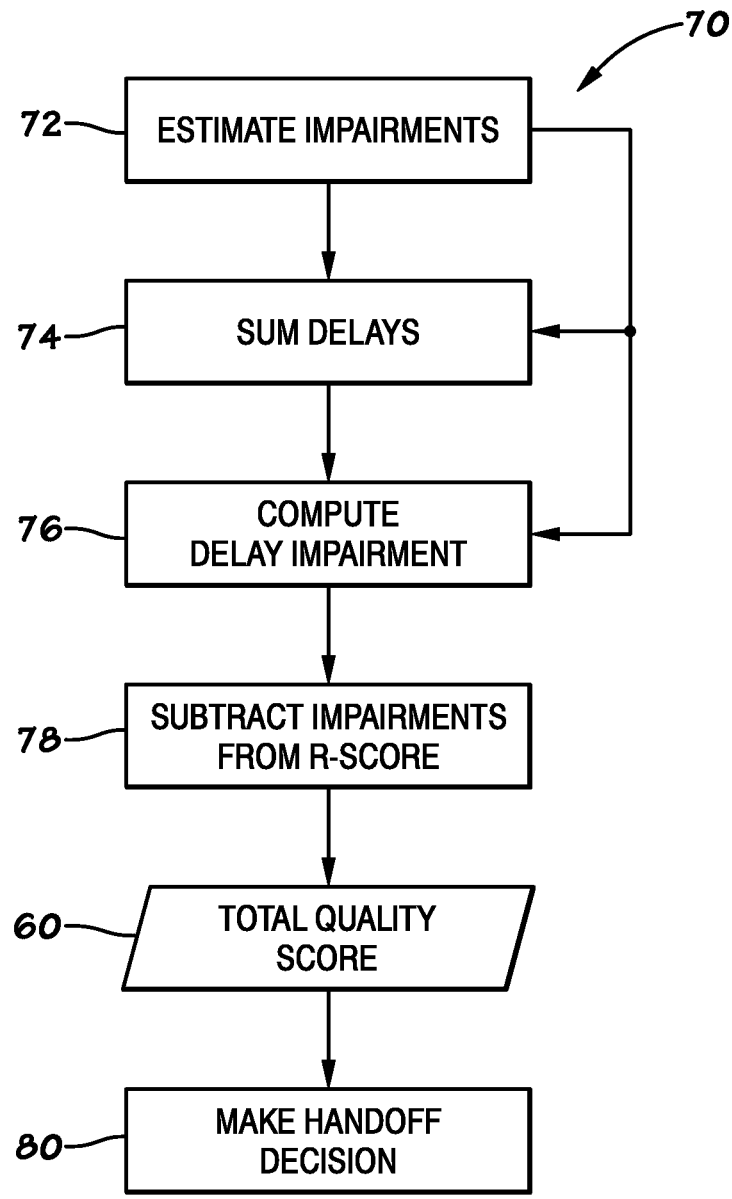
FIG. 4 is a flow chart summarizing a process for managing a handoff in a multimedia network, in accordance with embodiments of the present techniques.

FIG. 4 provides a flowchart summarizing a process 70 for managing handoffs in a multimedia network 10 in some embodiments of the present techniques. The process 70 may include estimating (block 72) impairments, including impairments along a communication route. As previously discussed, the impairments may be contributed by the vocoders (Iv), the subnetworks (Isn), or the RF links (Irf) in a communication route. The transfer of data through vocoders, subnetworks, and RF links may also result in delay, and these delays may be summed (block 74). The sum of the delays may be used to compute (block 76) a delay impairment (Idd), using, for example, the previously provided equations 1 and 2. All impairments may be subtracted (block 78) from an R-score to produce the total quality score 60 of a communication route. The total quality score 60 of a communication route may be used to conduct handoffs (block 80). For example, a processor 32 may compare the total quality score 60 of several communication routes to determine when and/or whether a handoff is to be conducted for a particular communication in a communication network 10. In some embodiments, a processor 32 may conduct a handoff from a first communication route which has fallen beneath some threshold voice quality score to a second route having an acceptable voice quality score (e.g., above 70 out of 100 or 75 out of 100, etc.).

In some embodiments, a handoff in a multimedia network 10 may be conducted before a voice quality score falls beneath a threshold level. For example, a network may store the total voice quality metrics of a communication device based on the spatial location of the device. Such information may be stored in any suitable storage unit (e.g., the network information query unit 62 and/or the information computed by the RF link quality analysis unit 64) of the network 10, and a suitable processor (e.g., processor 32) may access the stored total voice quality metrics to predict when a handoff is likely necessary. For example, if a user typically moves from one location to another, which results in a low total voice quality metric and a necessary handoff, a preemptive handoff may be made before the user moves to the location where voice quality becomes unacceptable. By conducting such preemptive handoffs, delays in establishing the handoff may be reduced. Thus, the user of a mobile communication device may traverse a communication route which results in a necessary handoff. Furthermore, preemptive handoffs may provide a safety interval to allow consideration for other handoff routes, should the usual handoff selection be impaired.

Furthermore, in some embodiments, a handoff may also be based on a cost associated with each possible communication route. For example, while one communication route may have a higher voice quality score than another, the processor 32 may still select a lower voice quality route based on a cost comparison between the two routes. Furthermore, thresholds for acceptable voice quality score may be variable depending on cost. Management of handoffs based partially on cost may be controlled by a communication device user, or may be pre-programmed While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of managing a communication path in a communication network, the method comprising:
    estimating a total voice quality metric for a communication path in the communication network, wherein estimating the total voice quality metric comprises subtracting voice signal impairments from a voice signal quality score, wherein the voice signal impairments comprises impairments associated with one or more radio frequency (RF) links in the communication network and impairments associated with one or more vocoders in the communication network, wherein impairments associated with one or more vocoders comprise a baseline vocoder quality for each of the one or more vocoders in the system, a vocoder quality degradation due to bit error or packet loss for each of the one or more vocoders, and a vocoder delay for each of the one or more vocoders and at least one of:
  impairments associated with one or more subnetworks in the communication network; or
  impairments associated with delays resulting from data transfer through the one or more vocoders, RF links, and subnetworks; and
selecting a communication path based on the total voice quality metric estimation.

2. The method of claim 1, wherein estimating the total voice quality metric comprises employing an algorithm including an International Telecommunication Union (ITU) E-model.

3. The method of claim 1, wherein the communication path comprises a signal transfer between a first communicating device, a second communicating device, and one or more network nodes and subnetworks in the communication network.

4. The method of claim 1, wherein the communication path comprises one or more of an RF link and a voice over internet protocol (VoIP) link.

5. The method of claim 1, wherein the communication path comprises one or more bit-oriented links or one or more packet-switched links.

6. The method of claim 1, wherein selecting the communication path comprises selecting a second communication path when the total voice quality metric estimation for a first communication path falls beneath a threshold.

7. The method of claim 1, comprising estimating the total voice quality metrics for more than one communication paths wherein selecting the communication path comprises switching to a second communication path when the second communication path has a higher total voice quality metric estimation than a total voice quality metric estimation of a first communication path.

8. The method of claim 1, wherein selecting the communication path comprises selecting a communication path with a highest total voice quality metric from a plurality of communication paths with lower total voice quality metrics.

9. The method of claim 1, comprising storing the total voice quality metric as a function of spatial location in the communication network, and wherein selecting the communication path comprises initiating a handoff based on a predicted spatial location of a communication device in the communication network.

10. A system for managing a handoff in a heterogeneous communication network, the system comprising:
  a memory storing executable instructions for:
    determining a vocoder impairment based on the vocoder selected for a communication path in the network;
    determining a radio frequency (RF) link impairment based on one or more RF links selected for the communication path;
    determining a subnetwork impairment based on the subnetwork selected for the communication path;
    determining a delay impairment based on a total delay incurred in transferring data through the selected vocoder, the selected one or more RF links, and the selected subnetwork;
    determining a total voice quality metric of the communication path based on the vocoder impairment, the RF link impairment, the subnetwork impairment, and the delay impairment; and
    determining whether to select a communication path based on the total voice quality metric of the communication path; and
  a processor configured to access the memory and to execute the instructions.

11. The system of claim 10, wherein determining the vocoder impairment comprises determining a baseline quality level of the vocoder and an impairment factor of the vocoder due to either bit errors or packet losses.

12. The system of claim 10, wherein determining the RF link impairment comprises estimating data loss incurred through the RF link and determining an impairment factor of the RF link due to bit errors or packet losses.

13. The system of claim 10, wherein determining the subnetwork impairment comprises determining an impairment factor due to bit errors or packet losses for each link in the subnetwork.

14. The system of claim 10, wherein the delay impairment is determined using one or more equations of the International Telecommunication Union (ITU) E-model.

15. The system of claim 10, comprising selecting a first communication path having a first total voice quality metric above a threshold level over a second communication path having a second total voice quality metric beneath the threshold level.

16. The system of claim 10, comprising selecting a first communication path having a first total voice quality metric that is higher than a second total voice quality metric of a second communication path.

17. The system of claim 10, comprising selecting a communication path based on a cost of the communication path relative to the other communication paths in the network.

18. The system of claim 17, wherein selecting the communication path based on the cost is manageable by a user in the network.

19. The system of claim 10, comprising storing the determined total voice quality metric as a function of a spatial location of a communication device in the network, and wherein determining selecting a communication path comprises predicting a likely communication path based on the stored total voice quality metric and conducting a preemptive switch to the communication path based on the prediction.

20. A communication system comprising:
  a memory configured to store vocoder information corresponding to one or more vocoders in a communication network, wherein the vocoder information comprises a baseline vocoder quality for each of the one or more vocoders in the system, a vocoder quality degradation due to bit error or packet loss for each of the one or more vocoders, and a vocoder delay for each of the one or more vocoders;
  a processor configured to select a communication path in the communication network by:
    determining a vocoder impairment based on the vocoder information;
    determining a radio frequency (RF) link impairment based on one or more RF links selected for the communication path;

determining a subnetwork impairment based on the subnetwork selected for the communication path;

determining a voice quality of the communication path based on the vocoder impairment, the RF link impairment, and the subnetwork impairment; and selecting the communication path based at least on the voice quality of the communication path.

21. The system of claim 20, comprising a processor configured to calculate the voice quality of the communication path based on error rates and loss in a radio frequency (RF) link and a subnetwork link in the communication system.

22. The system of claim 20, wherein the communication path comprises:

a link between a communication device and one of the one or more vocoders;

an RF link between the one of the one or more vocoders and a subnetwork of one or more subnetworks in the system; and one or more subnetwork links in each of the subnetworks.

23. The system of claim 22, wherein the processor configured to calculate the voice quality of the communication path is configured to calculate impairments in one or more of the first link, the one of the one or more vocoders, the RF link, and the one or more subnetwork links.

24. The system of claim 20, wherein the processor is configured to select the communication path based on cost of the communication path.

25. The system of claim 20, wherein the processor is configured to select the communication path for a mobile device that is part of the communication network.

* * * * *